United States Patent
Castello da Costa et al.

(10) Patent No.: US 6,230,130 B1
(45) Date of Patent: *May 8, 2001

(54) SCALABLE MIXING FOR SPEECH STREAMING

(75) Inventors: Paulo M. Castello da Costa, Sunnyvale; Nermeen Ismail, Mtn View; Ross P. Morley, San Jose; Atul N. Sinha, Cupertino, all of CA (US)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,375

(22) Filed: May 18, 1998

(51) Int. Cl.[7] ............................. G10L 13/02; H04N 7/52
(52) U.S. Cl. ........................... 704/258; 370/267; 379/202
(58) Field of Search .................................. 704/201, 258; 348/15; 370/267; 379/93.21, 202

(56) References Cited

U.S. PATENT DOCUMENTS

| | | | |
|---|---|---|---|
| 4,771,465 | 9/1988 | Bronson et al. ........................ 381/36 |
| 4,797,926 | 1/1989 | Bronson et al. ........................ 381/36 |
| 5,327,518 | 7/1994 | George et al. ......................... 395/2.2 |
| 5,539,741 | * 7/1996 | Barraclough et al. ................ 370/267 |
| 5,619,197 | 4/1997 | Nakamura .............................. 341/50 |
| 5,646,931 | 7/1997 | Terasaki ................................ 369/124 |
| 5,659,663 | 8/1997 | Lin ........................................ 395/2.67 |
| 5,703,794 | * 12/1997 | Heddle, et al. ........................ 700/94 |
| 5,890,017 | * 3/1999 | Tulkhoff et al. ....................... 710/65 |
| 5,963,153 | * 10/1999 | Rosefield et al. ..................... 341/61 |
| 5,986,589 | * 11/1999 | Rosefield et al. ..................... 341/61 |
| 6,008,838 | * 12/1999 | Iizawa ................................... 348/15 |

FOREIGN PATENT DOCUMENTS

| | | | |
|---|---|---|---|
| 6098317A | 4/1994 | (JP) | H04N/7/15 |
| 7264570A | 10/1995 | (JP) | H04N/7/15 |
| 8032950A | 2/1996 | (JP) | H04N/7/15 |
| 9710674A1 | 3/1997 | (WO) | H04N/7/15 |

OTHER PUBLICATIONS

Speech Coding and Synthesis, ed. W.B. Kleijn and K.K. Paliwal, Elsevier, 1995, especially pp.

* cited by examiner

Primary Examiner—Tālivaldis I. Šmits
(74) Attorney, Agent, or Firm—Peter Verdonk

(57) ABSTRACT

A speech processing system receives multiple streams of speech frames. The system selects among concurrent ones of the frames a subset of those frames that are the most relevant, based on pre-assigned stream priorities and energy content of the frames. The selected frames are then decoded and rendered. The resulting signals are mixed. This architecture provides bandwidth scalability and/or processing power scalability.

22 Claims, 4 Drawing Sheets

SCALABLE MIXING FOR SPEECH STREAMING

FIELD OF THE INVENTION

The invention relates to a method and a system for processing audio, using mixing of multiple concurrent streams of audio data. The invention relates in particular, but not exclusively, to the mixing of multiple concurrent streams of speech data.

BACKGROUND ART

Artificial processing of speech typically uses a digital representation of the data because of its robustness against distortion. Digital processing further allows streaming of data. Streaming enables audio data, such as speech data, to be compressed on the fly so that real time communication is possible, instead of requiring to wait for a file or a portion of it to download before acquiring access to it. For an introduction to speech processing, see, e.g., Speech Coding and Synthesis, edited by W. B. Kleijn and K. K. Paliwal, Elsevier, 1995, especially pp. 1–47, incorporated herein by reference.

Mixing of speech streams is required at a receiver when multiple speech streams must be rendered and played out through a single audio device. Mixing of speech streams is also desired at an intermediate point in the transmission path (e.g., at a server in a client-server architecture) when multiple speech streams are available that are to be combined into a single stream or into a reduced number of streams for retransmission to a particular receiver or to a group of receivers.

Mixing of multiple streams at the receiver requires the decoded streams to be rendered to produce the signals that are to be played out of the loudspeakers. The rendering function for each stream is defined by the application, and can range from simple duplication for monophonic reproduction through a set of two loudspeakers, to a complicated transfer function for providing loudspeaker compensation and for spatial localization of each sound source.

OBJECT OF THE INVENTION

It is an object of the invention to provide procedures for mixing multiple streams that reduce the processing power required with respect to existing schemes. It is another object to provide mixing procedures that reduce the bandwidth required with respect to existing schemes. It is yet another object to provide architectures that are scalable with respect to bandwidth and/or processing power.

SUMMARY OF THE INVENTION

To this end, the invention provides a method of audio processing. The method comprises mixing multiple concurrent audio streams. Each respective one of the streams comprises a respective sequence of frames. The method comprises the following steps. A subset of specific frames is selected from among the concurrent frames. Upon selection, the specific frames of the subset are decoded and rendered for producing specific signals. The specific signals are then mixed.

Preferably, the selection criterion involves a quantity that is inherent in each of the concurrent frames. In parametric coding schemes, for example, a particular frame comprises a parameter representing the frame's energy content, or a parameter indicating whether or not the frame relates to voiced or unvoiced speech. Alternatively or supplementarily, a parameter indicates a pitch. Alternatively or supplementarily, the amplitudes can be retrieved and added together to create another measure. Based on these quantities, possibly after additional weighting, the concurrent frames are ranked according to importance and the invention selects those frames for the decoding that are the most important. To give a more specific example, the selection criterion may be a mathematical relationship between the energy content and a rendering gain. The rendering gain is explained as follows. The decoded streams are to be rendered to produce the signals as played out by loudspeakers. The rendering gain is a quantity that represents the effect of the rendering on the perceptual intensity of the signal source. The rendering gain can be set to anything desired by the application developer. For example, the rendering gain is set to the sum of the energy gains from the decoded signal to each of the loudspeaker signals when rendering white noise (i.e., the sum of the energy of the impulse responses of the renderer.

The selection may involve respective priorities assigned to a respective one of the streams by the user or by the application developer. The priorities are independent of perceptual considerations. The selection step then creates a subset based on the priorities only or on the combinations of rendered energy and priority.

A variety of ways can be used to define concurrence. For example, concurrence of the frames can be determined on, e.g., time-stamping. As an other example, the concurrent frames are those frames that are present at the input of the selection step at the time the selecting is started. Buffering can be used to assist in the latter mode of operation to achieve temporal alignment.

Preferably, decoding is achieved through the use of sinusoidal decoder circuitry whose operation is based on overlap-add synthesis to limit audible artifacts. For sinusoidal coders see, e.g., U.S. Pat. Nod. 4,771,465 and 4,797,926, herewith incorporated by reference. For overlap-add synthesis, also in combination with sinusoidal decoders, see, e.g., U.S. Pat. No. 5,327,518 herewith incorporated by reference. Typically, the energy content of a frame is easier to obtain than decoding the entire frame. For example, a variety of coding schemes, e.g., linear-prediction coding and aforesaid sinusoidal coding, involve the transmission of a parameter representative of the signal power or energy per frame, along with the content data, see, e.g., Kleijn and Paliwal, cited supra, Chapter 1, especially pp. 36 and 37, and aforesaid U.S. Pat. No. 4,771,465. Accordingly, the energy content of a frame is readily available in order to carry out the selection of the specific frames without the need for extra processing power.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

First System

Figure 1:
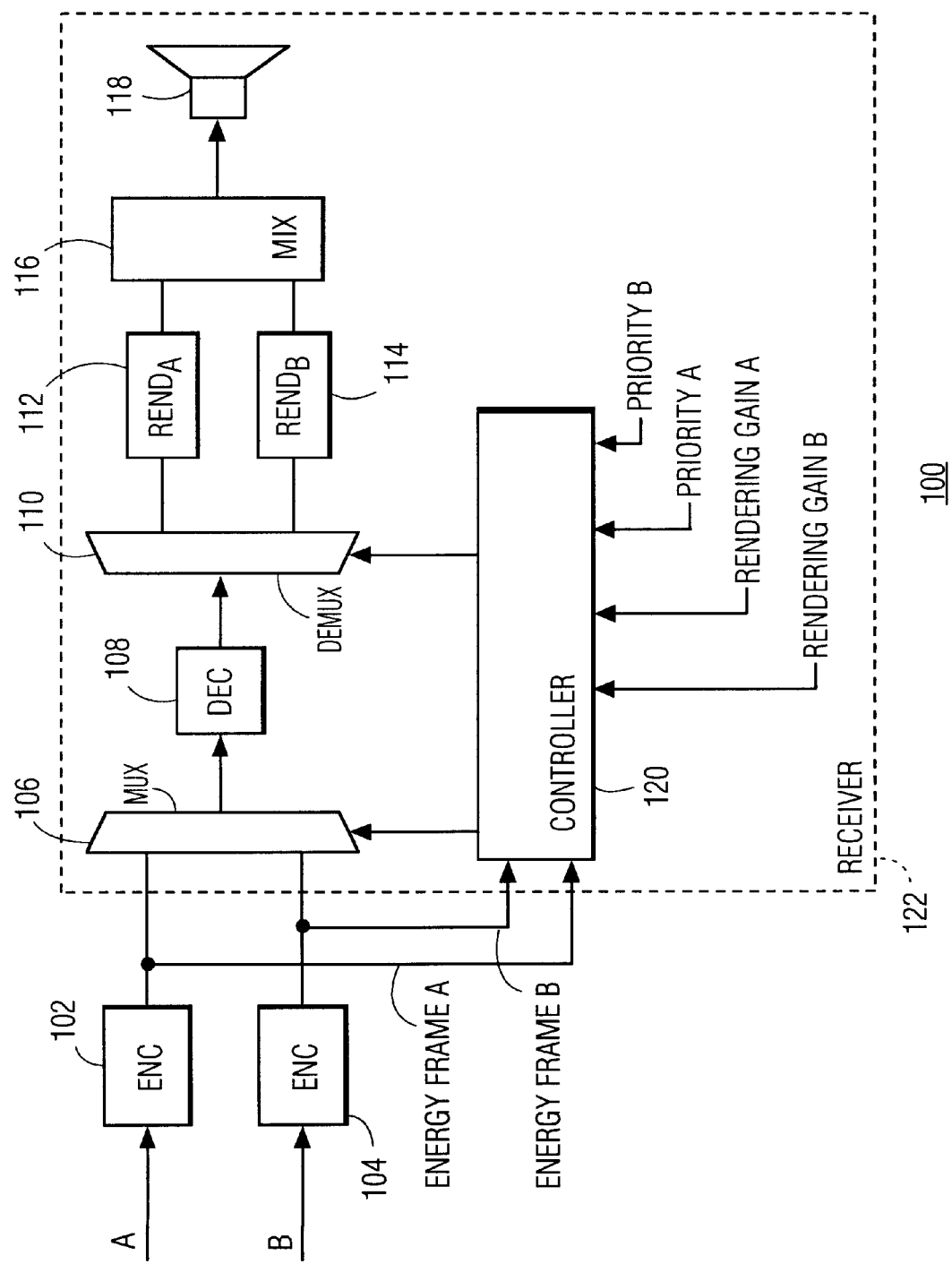
FIG. 1 is a block diagram of a first system for processing speech in the invention.

FIG. 1 is a block diagram of a first system 100 according to the invention for mixing first and second speech streams A and B. The mixing of N=2 streams is given by way of example. The essence of the invention applies to N=3, 4 , . . . etc. as well. System 100 comprises encoders 102 and 104 for encoding first and second streams A and B. Outputs of encoders 102 and 104 are coupled to inputs of a selector 106, here comprising an N-to-M multiplexer. An output of multiplexer 106 is coupled to an input of a decoder 108. Operation of encoders 102–104 and decoder 108 is based, for example, on a sinusoidal coding strategy. An output of decoder 108 is coupled to an input of a router 110, here comprising a demultiplexer. Outputs of demultiplexer 110 are coupled to first and second rendering circuits 112 and 114. Outputs of circuits 112 and 114 are coupled to a mixer 116, e.g., an adder. The output of mixer 116 is coupled to an audio output device 118, e.g., a loudspeaker. Rendering produces the signals that are to be played out by audio output device 118. System 100 further comprises a controller 120 to control multiplexer 108 based on energy content per frame, the rendering gain per stream, and priority assigned per stream as explained below. Controller 120 also controls demultiplexer 110 based on the identity of the stream that provides the frame decoded by decoder 108. Components 106–120 are part of a receiver 122.

The role of the rendering gain is as follows. Mixing of multiple streams A and B at receiver 122 requires the decoded streams to be rendered to produce the signals that are to be played out of loudspeakers 118. A rendering function for a stream could be determined per application or mode of use. Such function could range from simple duplication, for monophonic reproduction through a set of two loudspeakers, to a complicated transfer function for providing loudspeaker compensation and for spatial localization of each sound source. Such a rendering function can be used to gauge the perceptual effect of the rendering circuits on each stream, e.g., stream A, relative to the other streams, e.g., stream B. However, a rendering function is typically signal-dependent and possibly frequency-dependent. Using this function would make the rendering impractical and complicated. The invention therefore prefers to use a single number, the rendering gain, per stream. The gain is determined per application and per stream, and could be changed dynamically if so desired. The gain approximates the effect of a more sophisticated rendering function on the perceived intensity of the speech source associated with the particular stream. The energy content per frame of a stream is multiplied by the rendering gain set for this stream to produce a quantity referred to as the rendered energy.

The role of the priority is as follows. The relative importance of streams A and B at the input of decoder 108 may have a component independent of perceptual considerations. For example, the focus of attention of the listener or the muting of one or more sources can be controlled by setting the priorities. Accordingly, the application designer or the user can set the relative weight per stream by assigning the priorities.

Controller 120 assigns ranks to each of the N concurrent frames by means of a mathematical relationship involving rendered energy and priority. For example, each of the concurrent frames is ranked in decreasing order of the priority and if there is a tie, in decreasing order of rendered energy. Controller 120 then controls multiplexer 106 in such a way that the M=1 frames of the highest rank(s) are decoded and rendered, using a fixed number of M decoders 108 and a fixed number of rendering circuits.

Rendering circuits 112 and 114 generate rendered streams according to the identity (A or B) of the streams. Controller 120 therefore can control demultiplexer 110 based on the identity of the stream associated with the decoded frame. Alternatively, multiplexer 106 may provide the control signal to operate demultiplexer 110 based on the stream's identity.

System 100 thus provides a mixing strategy for decoding and, possibly, for rendering, that is scalable with respect to processing power, while providing acceptable results at the audio output.

Flow Diagram

Figure 2:
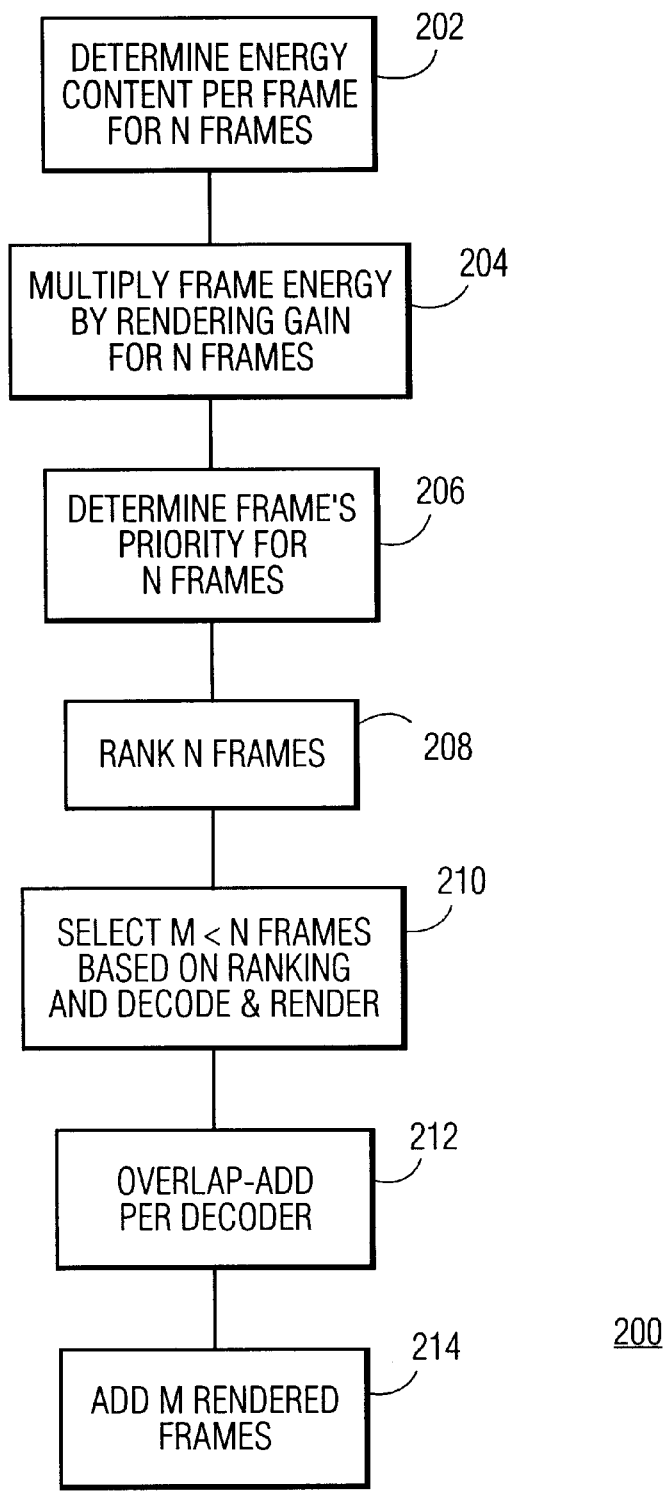
FIG. 2 is a flow diagram illustrating operation of the system of FIG. 1.

FIG. 2 is a flow diagram 200 that illustrates operation of system 100. The method is applied to a number of N concurrent speech streams of encoded frames being processed using a number of M decoders, wherein M is smaller than N. In the example of FIG. 1, N=2 and M=1.

In step 202 a number of N concurrent frames are examined and for each respective one of them a respective energy content is determined. Appropriate coding schemes, such as sinusoidal coding or and linear-prediction based coding, transmit a measure for the energy of each frame, along with the frame's content data. Accordingly, determining the energy content per frame can be done without decoding the frames or with less processing power than required by decoding of a complete frame.

In step 204, each respective one of the N frames processed in step 202 is assigned a rendered energy measure by means of multiplying the respective energy content by a respective factor called the rendering gain that is specific to the corresponding stream.

In step 206, for each of the N frames the priority relative of the other frames is determined based on the corresponding stream's priority, indicating the frame's relative importance.

In step 208, the N frames are ranked according to the priority of the associated stream, e.g., in decreasing order. If there is a tie, the frames concerned are ranked according to their respective rendered energy measure determined in step 204, e.g., also in decreasing order.

In step 210, the M frames of the highest rank are decoded and rendered, using a number of M decoders.

In step 212, M decoded and rendered streams are generated by overlap-adding each of the M decoded and rendered frames with preceding frames corresponding to the same stream.

In step 214, the M decoded and rendered streams are mixed by adding them all together.

Second system

Figure 3:
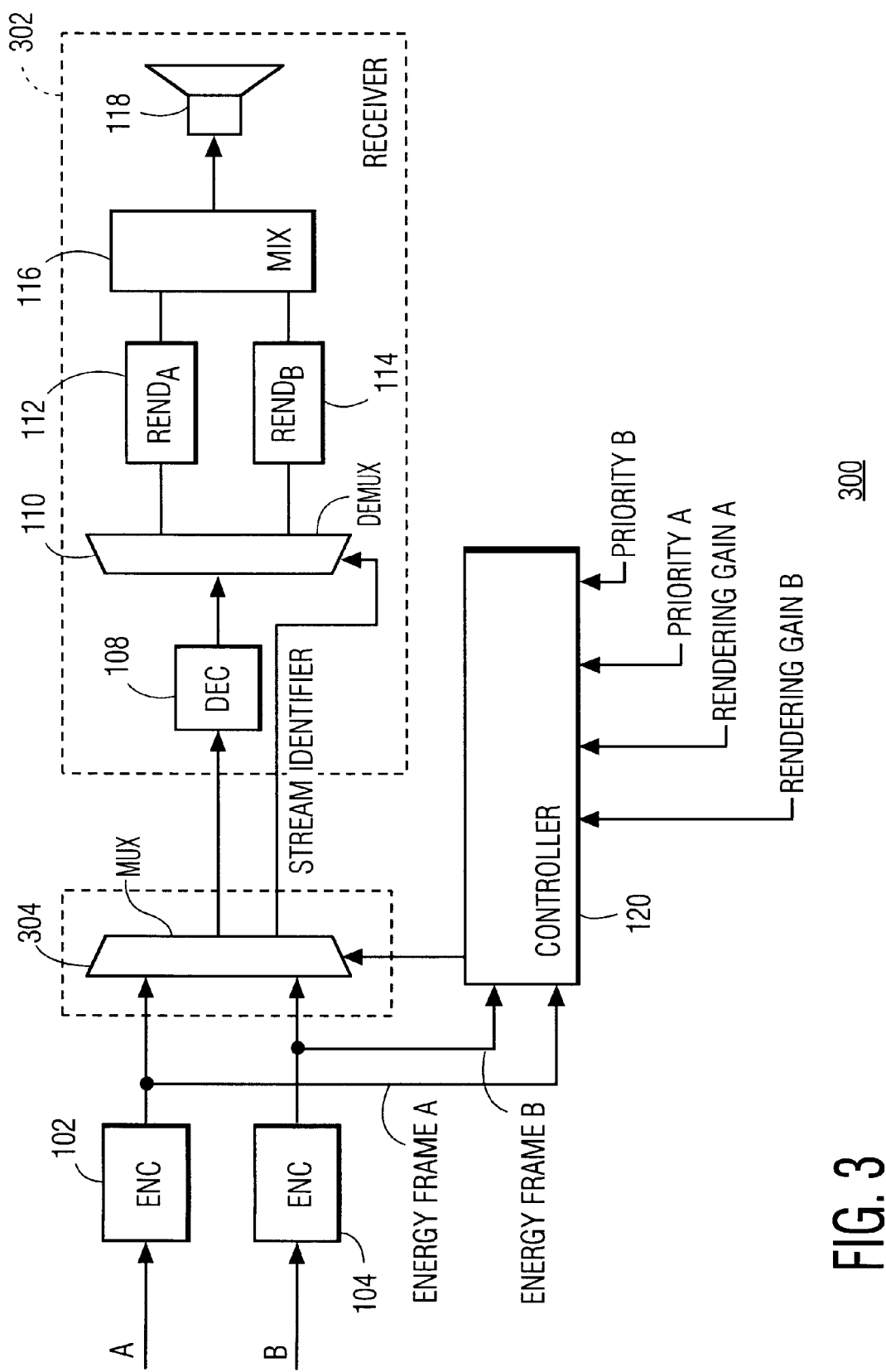
FIG. 3 is a block diagram of a second system of the invention.

FIG. 3 is a block diagram of a second system 300 in the invention. System 300 illustrates how a number of N incoming streams, here N=2 with streams A and B, are converted at an intermediary location into a single stream for transmission to a selected one of a plurality of receivers. FIG. 3 only shows a receiver 302 for clarity. Selection of the frames is now carried out by N-to-M multiplexer 304 at an intermediary location in the transmission path between encoders 102 104 and decoder 108. Only the M=1 frames selected according to, e.g., the criteria discussed supra, are sent to receiver 302, together with a stream identifier as mentioned in one of the alternative embodiments for system 100 above. Controller 120 may, but need not, be a part of receiver 302.

Note that the multiplexed stream from the intermediary location to each of the receivers does not require a coder that supports general audio streams. Bandwidth to each receiver is limited to that as required by M incoming streams (here M=1) plus an overhead for transmission of the stream identity per frame. This approach ensures bandwidth scalability. The stream identifier per frame is supplied to demultiplexer 110 via multiplexer 304 in this example. Processing power at the intermediary location is limited to calculating rendered energies and the ranking of streams. Decoding, rendering and mixing at the side of receiver 302 is equivalent to the processing of M streams, ensuring processing power scalability.

Third System

Figure 4:
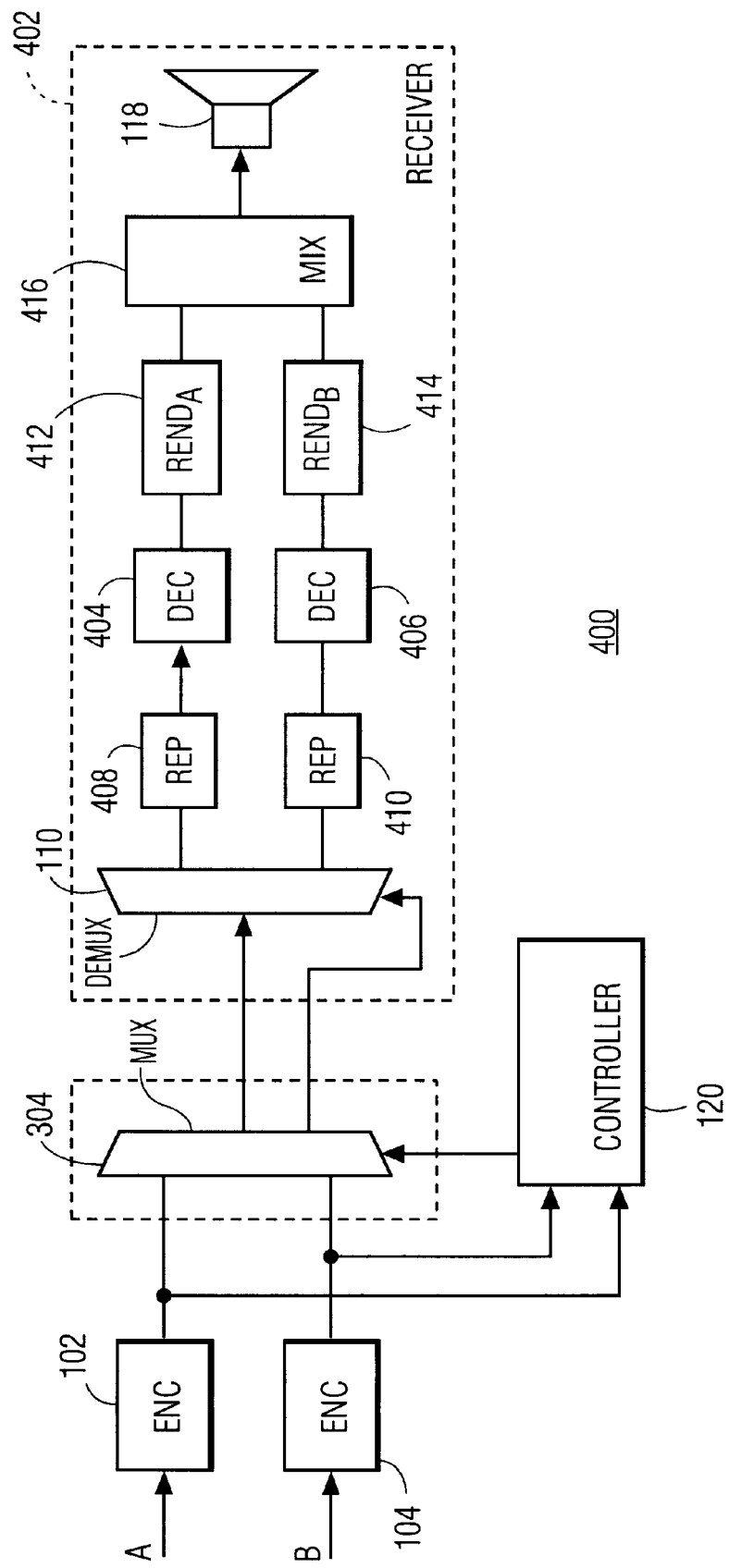
FIG. 4 is a block diagram of a third system of the invention.

FIG. 4 is a block diagram of a third system 400 of the invention and provides an alternative to systems 100 and 300. The processing strategies corresponding to the operation of systems 100 and 300 require decoders 108 to be switched from one stream to another when the specific frames of one subset stem from streams different from the specific frames from a next subset. Systems 100 and 300 rely on the continuity of the phase and on the overlap-add reconstruction (see the literature references cited supra) at receivers 122 and 302 in order to smoothen the transition between subsets of different streams corresponding to consecutive subsets of specific frames.

System 400 processes N=2 streams A and B. N-to-M multiplexer 304 is controlled to select the subset of M specific frames among N concurrent frames according to one of the selection criteria discussed supra. The M frames are sent to receiver 402 where M-to-N demultiplexer 110 assigns a specific one of the M selected frames of the current subset to one of N decoders 404 and 406 corresponding to the relevant one of the N streams. At the decoder side, the N-M frames discarded in the selection process are being treated as a frame loss. That is, decoders 404 and 406 are controlled to time stretch discretely or continuously, or are made to repeat, the frame previously received in order to recover from the frame loss. Repetition is achieved through repetition units 408 and 410, for example. Discrete time-stretching has advantages over simple repetition when using sinusoidal coding. The advantages relate to a reduction in complexity of the calculations needed. This is explained as follows. Sinusoidal coding is parametric (see Kleijn and Paliwal, cited supra). Decoding involves two steps: the reconstruction of the parameter settings from the encoded frame, and the running of the oscillators for a time period as indicated by the parameters. Decoding the same frame twice requires both steps to be carried out. Decoding once with time stretching requires the first step to be performed only once. The N streams of decoded frames at the outputs of decoders 404 and 406 are then rendered in renderers 412 and 414 and added in a mixer 416.

The operation of system 400 avoids switching between streams at the decoder. However, it requires N decoders and renderers to be run at the receiver. System 400 is scalable with regard to bandwidth.

Note that the invention relates to audio processing, and especially, but not exclusively, to the processing of speech.

Also note that the operation of controller 120, of decoders 108, 404 and 406, and of renderers 112, 114, 412 and 414 can be represented in software, e.g., as a computer program on a tangible medium such as a diskette for use with a PC. Further, the invention could also be implemented by enabling a user to carry out the method of the invention, e.g., through downloading the software from the Web. That is, the invention also relates to a method of enabling audio processing comprising mixing multiple concurrent audio streams. Each respective one of the streams comprises a respective sequence of frames. The method comprises following steps: enabling selecting among concurrent ones of the frames a subset of specific frames; enabling decoding the specific frames of the subset selected; enabling rendering the decoded specific frames for producing specific signals; and enabling mixing the specific signals. Videoconferencing, karaoke or playing music with multiple parties in different locations could benefit from the invention.

We claim:

1. A method of audio processing comprising mixing multiple concurrent audio streams, each respective one of the streams comprising a respective sequence of frames, wherein the method comprises:

dynamically selecting among concurrent ones of the frames a subset of specific frames;

decoding the specific frames of the subset selected;

rendering the decoded specific frames for producing specific signals; and mixing the specific signals.

2. The method of claim 1, comprising assigning a respective priority to a respective one of the streams, and wherein the selecting is carried out based on the respective priorities assigned.

3. The method of claim 1, comprising determining a respective energy content of the respective one of the concurrent frames, and wherein the selecting is carried out based on the respective energy contents determined.

4. The method of claim 3, comprising assigning a respective rendering gain factor to the respective one of the streams, and wherein the selecting is based on the respective energy contents and the respective rendering gain factors.

5. The method of claim 4, comprising assigning a respective priority to a respective one of the streams, and wherein the selecting is based on the respective energy contents, the respective rendering gain factors, and the respective priorities.

6. The method of claim 1, wherein each frame of the sequence of frames includes one or more parameters related to contents of the frame, selecting among concurrent ones of the frames is based at least in part on at least one of the one or more parameters.

7. A method of enabling audio processing comprising mixing multiple concurrent audio streams, each respective one of the streams comprising a respective sequence of frames, wherein the method comprises:

enabling dynamically selecting among concurrent ones of the frames a subset of specific frames;

enabling decoding the specific frames of the subset selected;

enabling rendering the decoded specific frames for producing specific signals; and enabling mixing the specific signals.

8. An information processing system for processing audio, comprising:

an input for receipt of multiple concurrent audio streams, wherein each respective one of the streams comprises a respective sequence of frames;

a selector coupled to the input for dynamically selecting among concurrent ones of the frames at the input a subset of specific frames and passing on the specific frames to a selector output; and decoding equipment coupled to the selector output for decoding the specific frames.

9. The system of claim 8, having a controller for controlling the selector based on respective priorities assigned to respective ones of the streams.

10. For use in the system of claim 9, a tangible medium comprising a computer program for representing the controller and for creating control data to control the selector based on at least one of following groups of input quantities:

the priorities; and respective energy contents of respective ones of the concurrent frames.

11. The system of claim 8, having a controller being operative to determine a respective energy content of each respective one of the concurrent frames and to control the selector based on the respective energy contents determined.

12. The system of claim 11, wherein the controller controls the selector based on a mathematical relationship involving the respective energy contents and respective quantities representing respective rendering gains.

13. The system of claim 11, wherein the controller controls the selector based on a mathematical relationship involving the respective energy contents, respective quantities representing rendering gain for each respective one of the streams, and respective priorities assigned to respective ones of the streams.

14. The method of claim 8, wherein each frame of the sequence of frames includes one or more parameters related to contents of the frame, and the selector is configured for selecting among concurrent ones of the frames based at least in part on the one or more parameters.

15. For use in an information processing system capable of supplying multiple concurrent audio streams, wherein each respective one of the streams comprises a respective sequence of frames: a receiver comprising:

an input for receiving the streams;

a selector coupled to the input for dynamically selecting among concurrent ones of the frames at the input a subset of specific frames and passing on the specific frames to a selector output; and decoding equipment coupled to the selector output for decoding the specific frames.

16. The receiver of claim 15, comprising a controller for controlling the selector based on respective priorities assigned to respective ones of the streams.

17. The receiver of claim 15, comprising a controller being operative to determine a respective energy content of each respective one of the concurrent frames and to control the selector based on the respective energy contents determined.

18. The receiver of claim 17, wherein the controller controls the selector based on a mathematical relationship involving the respective energy contents and respective quantities representing respective rendering gains.

19. The receiver of claim 17, wherein the controller controls the selector based on a mathematical relationship involving the respective energy contents, respective quantities representing rendering gain for each respective one of the streams, and respective priorities assigned to respective ones of the streams.

20. The receiver of claim 15, wherein, each frame of the sequence of frames includes one or more parameters related to the contents of the frame, and the selector is configured for selecting among concurrent ones of the frames based at least in part on the one or more parameters.

21. For use in an information processing system capable of supplying multiple concurrent audio streams, wherein each respective one of the streams comprises a respective sequence of frames; and wherein the system comprises a selector having a selector input for receiving the streams and operative to dynamically select among concurrent ones of the frames a subset of specific frames and to pass on the specific frames to a selector output:

a receiver comprising:

a receiver input for coupling to the selector output;

decoding equipment coupled to the receiver input for decoding the specific frames;

a controller having:

a controller input for receipt of information on respective priorities assigned to respective ones of the streams; and a controller output for connection to the selector for control of the selector based on the priorities.

22. The receiver of claim 21, wherein:

the controller has a second controller input for coupling to the selector input for receipt of information on a respective energy content of respective ones of the concurrent frames; and the controller controls the selector based on a combination of the priorities and the energy contents.

* * * * *